United States Patent
Wick et al.

(10) Patent No.: US 8,150,679 B2
(45) Date of Patent: Apr. 3, 2012

(54) APPARATUS, AND ASSOCIATED METHOD, FOR DETECTING FRAUDULENT TEXT MESSAGE

(75) Inventors: Corey W. Wick, Plano, TX (US); Marie Risov, Bloomfield, MI (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 901 days.

(21) Appl. No.: 12/192,913

(22) Filed: Aug. 15, 2008

(65) Prior Publication Data

US 2010/0042402 A1  Feb. 18, 2010

(51) Int. Cl.
*G06F 17/27* (2006.01)
(52) U.S. Cl. ............... 704/9; 704/8; 709/206
(58) Field of Classification Search ............ 704/9, 8; 709/206
See application file for complete search history.

(56) References Cited

U.S. PATENT DOCUMENTS

| | | | |
|---|---|---|---|
| 7,809,795 B1 * | 10/2010 | Cooley et al. | 709/206 |
| 7,836,061 B1 * | 11/2010 | Zorky | 707/749 |
| 2004/0260776 A1 | 12/2004 | Starbuck et al. | |
| 2005/0198160 A1 | 9/2005 | Shannon et al. | |
| 2005/0262210 A1 | 11/2005 | Yu | |
| 2007/0011323 A1 | 1/2007 | Gaal | |
| 2007/0219776 A1 * | 9/2007 | Gamon et al. | 704/9 |
| 2009/0276208 A1 * | 11/2009 | Pagan | 704/9 |

OTHER PUBLICATIONS

Bei Yu, et al. "English Usage Comparison between Native and non-Native English Speakers in Academic Writing" In Proceedings of 17th Joint International Conference of the Association for Computers and the Humanities and the Association for Literary and Linguistic Computing, 2005.*
Notification of Transmittal of the International Search Report and the Written Opinion of the International Searching Authority or the Declaration, dated Feb. 18, 2010 from counterpart PCT application Serial No. PCT/US2009/052668 filed Aug. 4, 2009 (4 pages).
Written Opinion of the International Searching Authority, dated Feb. 18, 2010 from counterpart PCT application Serial No. PCT/US2009/052668 filed Aug. 4, 2009 (4 pages).
International Search Report, dated Feb. 18, 2010 from counterpart PCT application Serial No. PCT/US2009/052668 filed Aug. 4, 2009 (3 pages).

* cited by examiner

*Primary Examiner* — Vincent P Harper

(57) ABSTRACT

An apparatus, and an associated method, detects spam and other fraudulent messages sent to a recipient station. The textual portion of a received message is analyzed to determine whether the message includes errors made by non-native language speakers when authoring a text message. A text analysis engine analyzes the text using rules sets that identify grammatical errors made by non-native language speakers, usage errors made by non-native language speakers, and other errors.

18 Claims, 3 Drawing Sheets

APPARATUS, AND ASSOCIATED METHOD, FOR DETECTING FRAUDULENT TEXT MESSAGE

The present invention relates generally to a manner by which to detect that a received e-mail, or other text, message is a spam, or other fraudulent, message. More particularly, the present invention relates to an apparatus, and an associated method, by which to determine whether the message is fraudulent by analyzing the message for text typical of that used by non-native language speakers.

Rule sets that include listings of grammatical and usage errors typically made by non-native language speakers are accessed and used to analyze the text of the received message. If the received message is determined likely to be written by a non-native language speaker and has other characteristics indicative of a fraudulent message, the message is considered likely to be a fraudulent message.

BACKGROUND OF THE INVENTION

Advancements in communication technologies have permitted the development, deployment, and regular usage of new types of communication services. For many, access to communicate using these communication services is an integral part of their everyday life, both for business communications and for personal communications.

For instance, communications are regularly carried out through use of processor-based devices, such as computer stations that are connectable to a communication network. Conventional, personal computers, are connectable to private networks and public networks, e.g., the internet. Once connected, communication data sourced at the computer station is able to be communicated elsewhere, such as to another, similarly connected computer station. Connection to the communication network is variously made by made of a wireline connection or a wireless connection. For instance, a wireless connection by way of any radio air interface defined in any of various cellular communication systems, WiFi-based communications, IEEE 802.11-based communications, etc.

Text messages, such as e-mail messages, are regularly communicated between computer, or other communication, stations by way of a communication network. An e-mail service is sometimes referred to as a store-and-forward service as the originator of the message and the recipient of the message need not concurrently be available for sending and receiving of the created message to be carried out. Rather, the message, once created, is routed to a mail-service server, or other device, for delivery to the recipient when the recipient is available to receive the message. The mail server, or like device, stores the message until the recipient is available, and, when available, the message is forwarded on to the recipient.

Generally, the message includes an identification of the originator of the message, an identification of the intended recipient of the message, a message body including a subject line, and, sometimes, attachments.

Typically, charges do not accrue to a sender or recipient of a message. Rather, the sending and receiving of the messages are generally included in a service subscription or periodic access charged for a network connection.

The generally free nature of sending of messages sometimes results in abuse of such communication services. As almost anyone that uses a mail service to send or to receive messages is aware, many messages are sent by unknown senders, often times soliciting sales of products or services that are unwanted by the recipient and, often times, are of unsavory natures. These messages are sometimes referred to as being spam messages. And, some messages try to induce the recipient to purchase goods that shall never be shipped or to provide financial information that permits the recipient to be defrauded. All of these messages shall be referred to herein, at times, as fraudulent messages. Many times, these fraudulent messages originate from locations far distant from the jurisdictional area in which the recipient is located.

Unfortunately, large numbers of spam messages are communicated. Some estimate that the number of spam messages exceed, by a significant amount, the numbers of legitimate messages that are communicated by way of public networks. As many know, the number of spam messages received at a recipient's in-box upon opening the mail client of the recipient or application regularly includes such spam, or other fraudulent, messages. To reduce the number of fraudulent messages directed to a recipient's in-box of the recipient's mail client or application, filters have been developed to filter such messages. When a filter detects a fraudulent message, the message is either deleted or routed to a folder other than the in-box of the recipient. That is to say, operation of the filter filters the fraudulent message so that the in-box folder of the recipient is not cluttered with the unwanted messages.

Spam filters work in various manners to distinguish between legitimate messages and fraudulent, i.e., spam, messages. Keyword or character string recognition is sometimes utilized. Concept identification, user-defined, rule-based filtering, analysis of the identity of the originator, statistical analysis of message content, and comparison with filter-data bases of similar messages, are all sometimes utilized.

In spite of best efforts, however, the existing filters often times either filter legitimate messages or fail to filter fraudulent messages. Excessive filtering and inadequate filtering of received messages both are problematical.

If an improved manner could be provided by which better to filter received messages, problems associated with excessive filtering and inadequate filtering would be lessened.

It is in light of this background information related to communication of messages that the significant improvements of the present invention have evolved.

SUMMARY OF THE INVENTION

The present invention, accordingly, advantageously provides an apparatus, and an associated method, by which to detect that a received e-mail, or other text, message is a spam, or other fraudulent, message.

Through operation of an embodiment of the present invention, a manner is provided by which to determine whether the message is fraudulent by analyzing the message for textual portions that are typical of text entered by non-native language speakers, in conjunction with conventional methods of fraud analysis (i.e., keyword or content analysis).

In one aspect of the present invention, rule sets that include listings of grammatical and usage errors that are typically made by non-native language speakers are accessed and used to analyze the received message. If a received message containing potentially fraudulent content is determined likely to have been written by a non-native language speaker, a higher probability of fraud is indicated. By taking into account the syntactical patterns including grammatical errors and usage patterns, improved filtering of received messages is provided.

In another aspect of the present invention, a message is received at a communication device, such as a computer station, mobile station, or any other type of device capable of leaving an e-mail, or other text, message. The received message is of any conventional format and includes, e.g., an IP (internet protocol) address identifying the recipient in a header part of the message and a textual portion that forms the message content. The textual portion comprises ASCII text or text formatted in any conventional manner.

In another aspect of the present invention, the received message is initially filtered at an initial filter stage. Filtering performed at the initial filtering stage includes, e.g., a conventional filtering technique. Conventional filtering techniques include, e.g., keyword or character-string recognition and related content analysis, concept identification, user-defined, rule-based filtering, analysis of mail routing, e.g., originating IP addresses, originating mail addresses, detection of bulk transmission of messages, statistical analysis of message content, and comparison with filter databases of other messages.

In another aspect of the present invention, a text analysis engine is provided with the text portion of the received message. The text analysis engine parses the received message to analyze its contents and to determine whether the message is likely to have been created by a non-native language speaker.

In another aspect of the present invention, a rules set is provided that identifies grammatical errors typically made by non-native language speakers. The errors include, e.g., verb-tense, subject-verb errors, etc. that are made by those not fully familiar with grammatical rules and word usage of the language used in the textual portion of the message.

In another aspect of the present invention, a set of rules is provided that indicates usage patterns typically utilized by non-native language speakers. The usage patterns, while grammatically correct, are patterns not typically used by fluent speakers of the language. The usage patterns are those not generally utilized by fluent language speakers and such usage is generally noticeable to one having fluency in the language.

In another aspect of the present invention, a rules set is provided that identifies general errors made both by non-native language speakers as well as native language speakers. The general errors regularly made both native and non-native speakers of, e.g., the English language, include splices and noun-verb disagreements.

In another aspect of the present invention, a text analyzer accesses each of the rule sets and uses the indications and rules therein pursuant to analysis of the textual portion of the received message. The analysis is performed, e.g., sequentially. That is to say, for instance, first the rules relating to errors of non-native language speakers is accessed, and the text of the received message is analyzed with respect to this first set of rules. Then, e.g., the rules identifying non-native language speakers' usage patterns are accessed. And, the text of the received messages is analyzed with respect to this second set of rules. Then, e.g., the rules associated with general errors are accessed, and the text of the received message is analyzed with respect to this third set of rules.

In another aspect of the present invention, the errors detected by the text analyzer, in each of the iterations, are weighted. Weighting factors are determined by weighting-factor calculations. Once the weighting-factor calculations are performed, weighting factors are obtained and combined with associated analysis results.

In another aspect of the present invention, a probability value is provided. The probability denotes the probability that the received message is a fraudulent message, i.e., a spam message. The probability is a mathematical function of content, non-native errors, non-native usage, and general errors that are identified during analysis by a text analyzer. The mathematical function is performed, for instance, by a calculator of a text analysis engine, and a resultant probability is obtained. The resultant probability is used to alert a viewer of the message of the likelihood that the received message is a fraudulent message. Or, the value is used to cause automatic routing of the message to a folder, such as a spam folder.

Improved filtering of received messages is thereby provided as messages determined to have been constructed by non-native language speakers are more likely to be spam messages that might otherwise not be detected by conventional filtering techniques.

In these and other aspects, therefore, an apparatus, and an associated method, is provided for facilitating detection that a received text message forms a fraudulent message. A text analyzer is configured to analyze a textual portion of the received text message to detect non-native language content. A detector is configured to detect, based upon analysis made by the text analyzer, at least an indicia indicative of whether the received message forms a fraudulent message.

A more complete appreciation of the scope of the present invention and the manner in which it achieves the above-noted and other improvements can be obtained by reference to the following detailed description of presently preferred embodiments taken in connection with the accompanying drawings that are briefly summarized below, and by reference to the appended claims.

DETAILED DESCRIPTION

Figure 1:
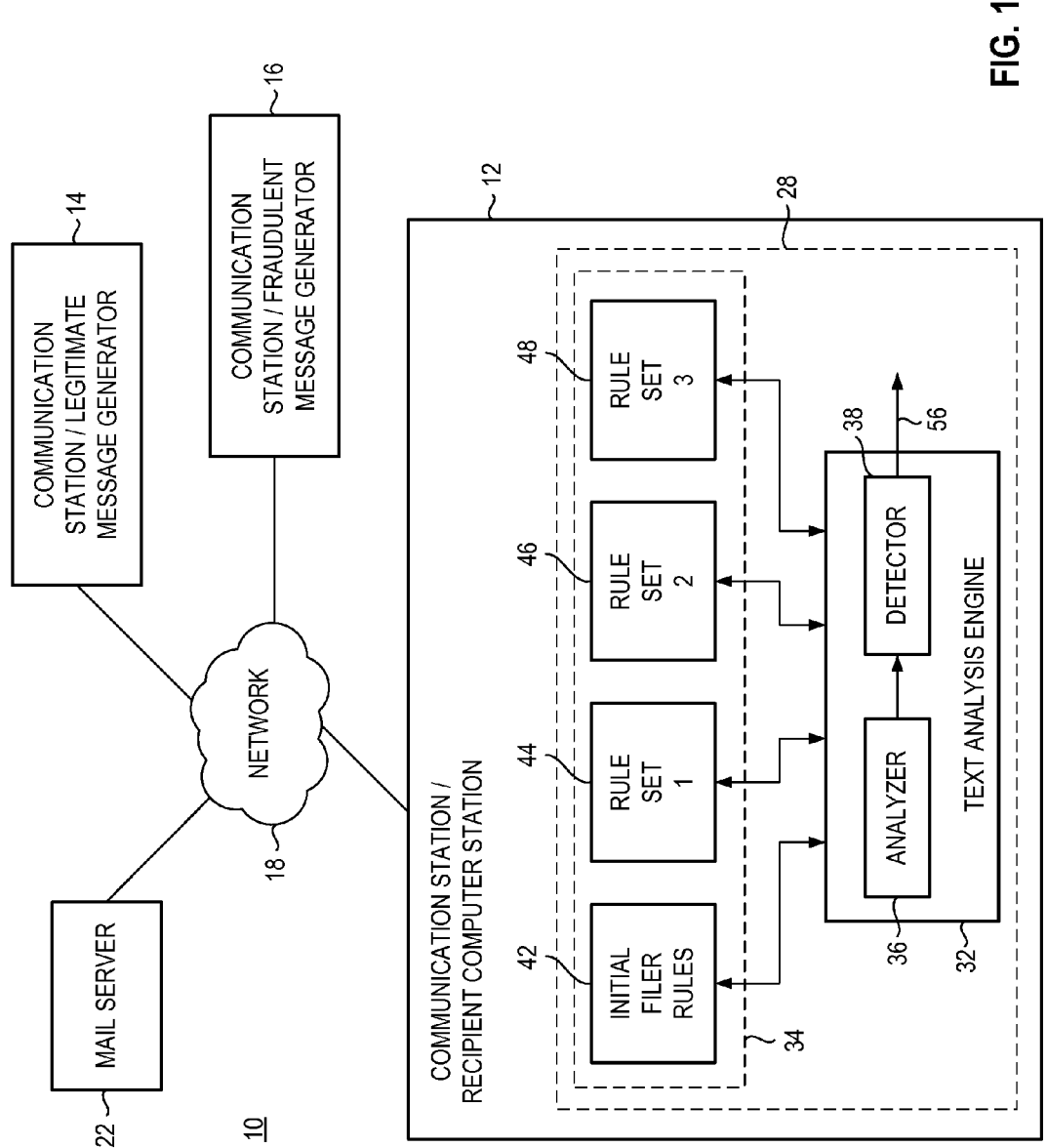
FIG. 1 illustrates a functional block diagram of an arrangement in which an embodiment of the present invention is operable.

Turning first to FIG. 1, an arrangement, shown generally at 10, forms a communication system of interconnected communication devices. The communication devices here include a communication station formed of a computer station 12 and communication stations 14 and 16. The computer station 12 and the stations 14 and 16 are interconnected by way of a data network 18, such as the internet. The computer station 12 is here representative of a receiving station that receives messages generated from other stations, here the stations 14 or 16. The station 14 is representative of an originating e-mail generator that generates legitimate e-mails, and the station 16 is representative of a fraudulent e-mail message generator that generates spam or fraudulent messages. The arrangement further illustrates a mail server 22 through which mail messages are routed to the computer station 12. It should be noted at the outset that the arrangement 10 shown in FIG. 1 is merely is exemplary. In other implementations, the communication system is configured in other manners. Of significance here is there delivery of an e-mail message to a recipient, i.e., the device 12 and determination thereat of the likelihood of the received message being a fraudulent, e.g., spam message.

Communication of a message by the station 14 is effectuated by way of the network 18 and the mail server 22 for ultimate delivery to the computer station 12. Analogously, a message originated at the station 16, addressed to the user of the computer station 12 is routed through the network 18, the mail server 22, and directed on to the computer station 12 when the user's e-mail application at the computer station 12 is opened.

While fraudulent messages are originated at any of many locations, many of such fraudulent messages are sourced at stations in jurisdictions other than the jurisdiction of the recipients of the messages. Fraudulent message generators sometimes choose such locations to be beyond the jurisdiction of local law enforcement and regulatory authorities that govern the area in which the recipient is located. Being beyond the reach of the local enforcement and regulatory authorities makes less likely that fraudulent activities of which a fraudulent mail message might be part shall be prosecuted or prevented. Due to the prevalence of the offshore locations of the originations of the fraudulent messages, the messages regularly are created by language speakers that are not fluent in the language used in the area of the recipient. For instance, if the recipient is located in the United States, a message originated in an East Asian or Far East Asian country is quite possibly authored by one not fully fluent in the English language. Advantage is taken of this prevalence in operation of an embodiment of the present invention.

The computer station 12, or like device, forms a receiving station used by a recipient includes an apparatus 28 of an embodiment of the present invention. The elements of the apparatus are functionally represented, implementable in any desired manner, including, e.g., by algorithms executable by processing circuitry, hardware elements, and combinations thereof. And, while the apparatus 28 is, in the exemplary implementation, embodied at the station 12 at which the recipient is positioned, in other implementations, the apparatus is embodied elsewhere or at more than one physical location.

The apparatus 28 here includes a text analysis engine 32 and a memory element 34. The text analysis engine 32 is capable of accessing the memory element 34.

The text analysis engine includes and analyzer 36 and a detector 38. And, the memory element includes filtering rule sets 42, 44, 46, and 48. The rule set 42 sets forth initial filtering rules. The rule set 44 sets forth grammatical errors typically committed by non-native language speakers. The rule set 46 sets forth usage errors typical of non-native language speakers. And, the rule set 48 sets forth general errors committed by both non-native language speakers as well as native language speakers.

In operation, at least the textual part of a received message is provided to the text analysis engine 32. In the exemplary implementation, the analyzer 36 of the text analysis engine 32 iteratively operates upon, and parses, the text of the received message to analyze the message for characteristics indicative of a fraudulent message.

First, the rules set 42 is invoked. The rules set provides initial filtering of the message. The initial filtering includes, e.g., conventional filtering operations, such as keyword or character string recognition and related content analysis, concept identification, comparison of the message with filter databases of similar messages, user-defined, rule-based filtering operations, and statistical analysis of message content. In one implementation, initial filtering is also performed at the mail server 22, or elsewhere at the network, to analyze the routing of the message, determination of the originating address of the message, its IP address, and bulk e-mail message detection made thereat. In one implementation, if the initial filtering indicates the message to be a fraudulent message, the message is caused to be routed to a special folder, e.g., a spam folder, or rejected. In another implementation, the message is not immediately rejected but, rather, is further analyzed.

Subsequent to the initial filtering, the analyzer invokes the rules set 44. The rules set 44 is used by the analyzer to analyze the received message text for grammatical errors that are typically made by non-native language speakers. For instance, with respect to the English language, non-native language speakers often times make improper conjugations of verb tenses, such as the past-participle tense. English is one of only a few languages that uses present-tense verbs to describe past actions. For instance, "what did you had for lunch", is a typical of grammatical error made by a non-native language speaker. And, "what did you had" is also exemplary of a typical mistake made by a non-native language speaker. Additionally, the absence of a article before a noun, e.g., "going to American continent" rather than "going to the American continent" is also a typical grammatical error. Other typical grammatical errors include, e.g., placement of an adjective after a noun rather than before a noun, e.g., "house white" rather than "white house". And, improper use of the propositions "in" and "on" as well as number disagreements, e.g., "one of my client has not collected his money" are also exemplary of typical grammatical mistakes made by non-native English speakers. When the rules set 44 is accessed and invoked, the analyzer analyzes the received text for occurrence of such grammatical errors. Indications of the errors are provided to the detector 38.

The analyzer also, here next, accesses the rules set 46 and operates upon the received text using the error rules set forth therein. The error rules of the rules set 46 identify syntax and unusual word usage typical of non-native language speakers. Again, with respect to the English language, exemplary abnormal usage patterns include introductory clauses started with "please", e.g., "please if you are interested, reply by tomorrow". Another exemplary non-native usage pattern comprises showing possession with "of" instead of "s", e.g., "at the house of my mother" instead of "at my mother's house". And, another exemplary, non-native language speaker usage pattern comprises, e.g., "inside the morning" instead of "in the morning". Analysis results formed by the analyzer 36 in this iteration are also provided to the detector 38.

Additionally, and, here, next, the analyzer accesses and invokes the rules set 48. The rules set 48 identifies grammatical errors made by both native language speakers and non-native language speakers. With respect again to the English language, exemplary such errors include, comma splice mistakes and noun-verb disagreements. When such errors are made in conjunction with errors identified by the rules sets 44 and 46, there is an increased possibility of the received message being a fraudulent message. Results of the analysis made by the analyzer in this iteration are also provided to the detector 38.

The detector 38 weights the analyzed results and forms a value, here on the line 56, that indicates the likelihood of the received message being a fraudulent message. The value is used, e.g., to alert the viewer of the message being fraudulent or automatically to route the message to a special folder.

The detector 38, in the exemplary implementation, comprises, or includes, a calculator that calculates a fraud probability value. The fraud probability value is mathematical function of content, non-native language errors, non-native language usage, and general errors, such as those ascertained during operation of the analyzer of the text analysis engine.

In the exemplary implementation, weighting of the values is further performed, and weight factors are also performed.

For instance, the weight of non-native errors, N, is one of the components of the probability calculation. For each type of error, E, occurring in the text, a number of occurrences are summed and divided by a total word count of the text message. The calculations for each type of error are then added, and their weight is increased by an amount, such as by 50%. This addition represents the greater importance of non-native errors compared to non-native usage. A word count is ultimately adjusted by dividing by a number, such as 2, 3, etc. to make the resulting weight easier to use in an overall fraud calculation.

The calculation for non-native language usage weight, U, is analogous to, and similar to, that for the non-native language error value N. One is added so that N+G, a general error factor, in the final algorithm always increases a content score. If N+G results in anything less than 1, this result would not be possible. The calculation for the general error weight G is also analogous. 1/1 is added to the summation of calculations for each type of general error. This prevents multiplication by zero.

A mathematical representation of the fraud probability value or score, F is:

$$F=C+\theta C((\alpha N+U)+\beta G)), \text{ where:}$$

C=Content Score;
F=Fraud Probability Score;
N=Non-Native Language Error Factor;
U=Usage Factor; and
G=General Error Factor; and
$\theta$, $\alpha$, $\beta$ are parameters optimized during training Those skilled in the art will recognize that initial settings of $\theta=10$, $\alpha=1.5$, and $\beta=1$ constitute plausible parameters in and of themselves that can be optimized as the model is tested against a set of pre-classified data. Parameter Theta ($\theta$) governs how much weight the error component as a whole contributes compared to the pure C score. Parameters Alfa ($\alpha$) and Beta ($\beta$) make the weight of each component adjustable.

By way of an example, if the content score C is 20, N is 0.4, and G is 1.2, F (the resulting fraud probability score) is 45.2 when weighting is taken into consideration.

In this example, if no instances of non-native error or usage are present in the text message, the content score 20 is simply multiplied by 1.2 (G), increasing the fraud probability score only slightly (as significance of general increases and decreases relative to the weights of the other three factors).

Conversely, a low content score of 5, triggered by one or two financially-related keywords, e.g., could be compounded by the presence of non-native errors, non-native usage, and general errors, elevating the fraud probability to a higher level.

Figure 2:
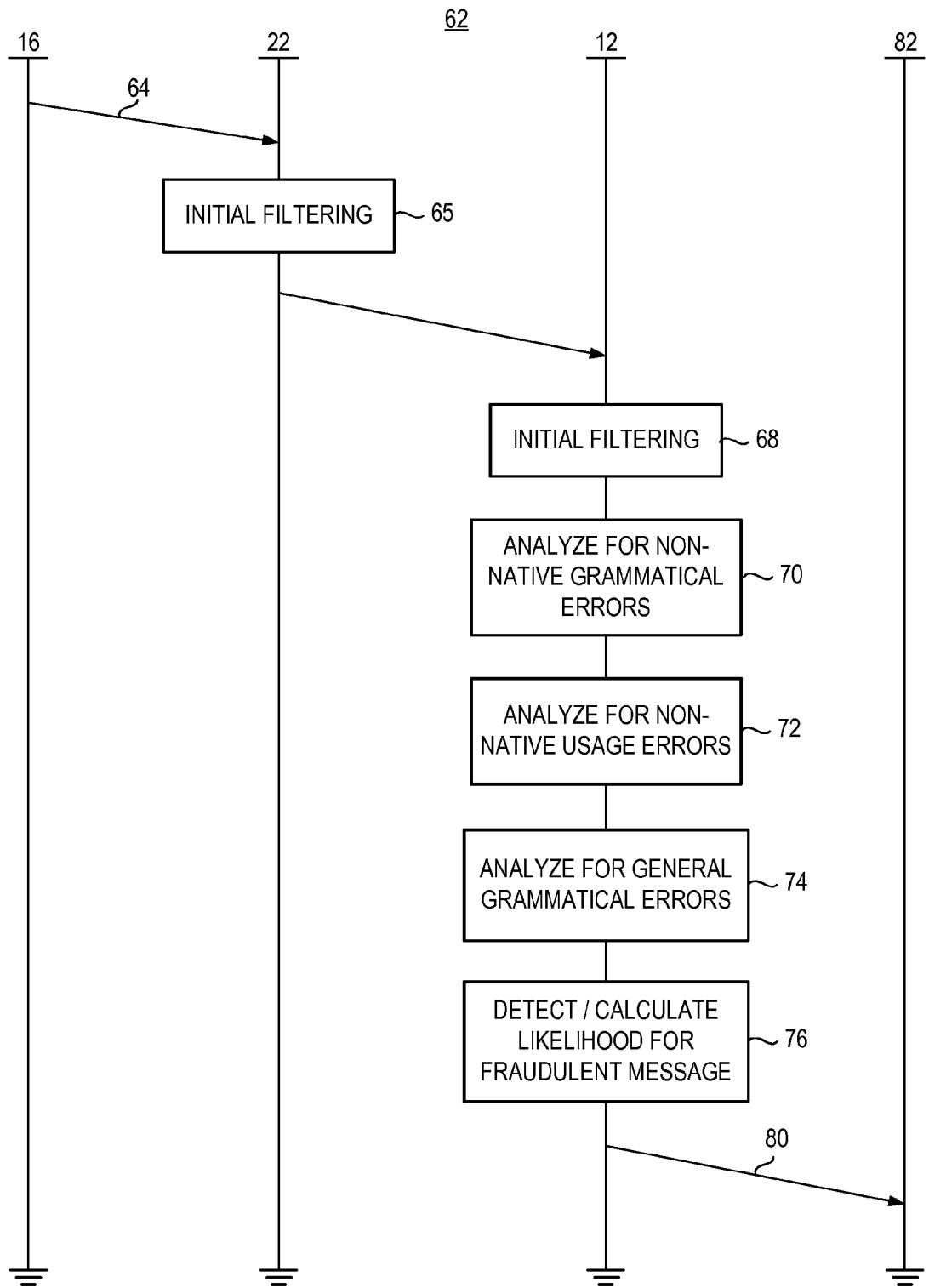
FIG. 2 illustrates a sequence diagram representative of the sequence of exemplary operation of the arrangement shown in FIG. 1.

FIG. 2 illustrates a sequence diagram 62 that is representative of operation of portions of the arrangement 10 shown in FIG. 1. Here, fraudulent message is generated at the fraudulent message generator formed of the communication station 16. The message is sent, indicated by the segment 64 through a network to the mail server 22. First initial filtering is performed at the mail serve 22. And, here, the message is forwarded on, indicated by the segment 66, to the computer station 12. At the computer station 12, additional initial filtering is performed, indicated by the block 68, analysis of the message is made, indicated by the block 70, for inclusion of grammatical errors typically made by non-native language speakers. Then, and as indicated by the block 72, analysis is made of the received message to detect whether the message includes usage errors typically made by non-native language speakers. And, then, as indicated by the block 74, analysis is made of the received text to determine whether the message includes general grammatical errors.

Responsive to the analysis indicated by the blocks 70, 72, and 74, detection is made, such as through calculation of a probability value, as to whether the received message is likely to be a fraudulent message. If the message comprises a fraudulent message, a warning is generated, indicated by the segment 80 that is displayed at a display 82 of the computer station.

Figure 3:
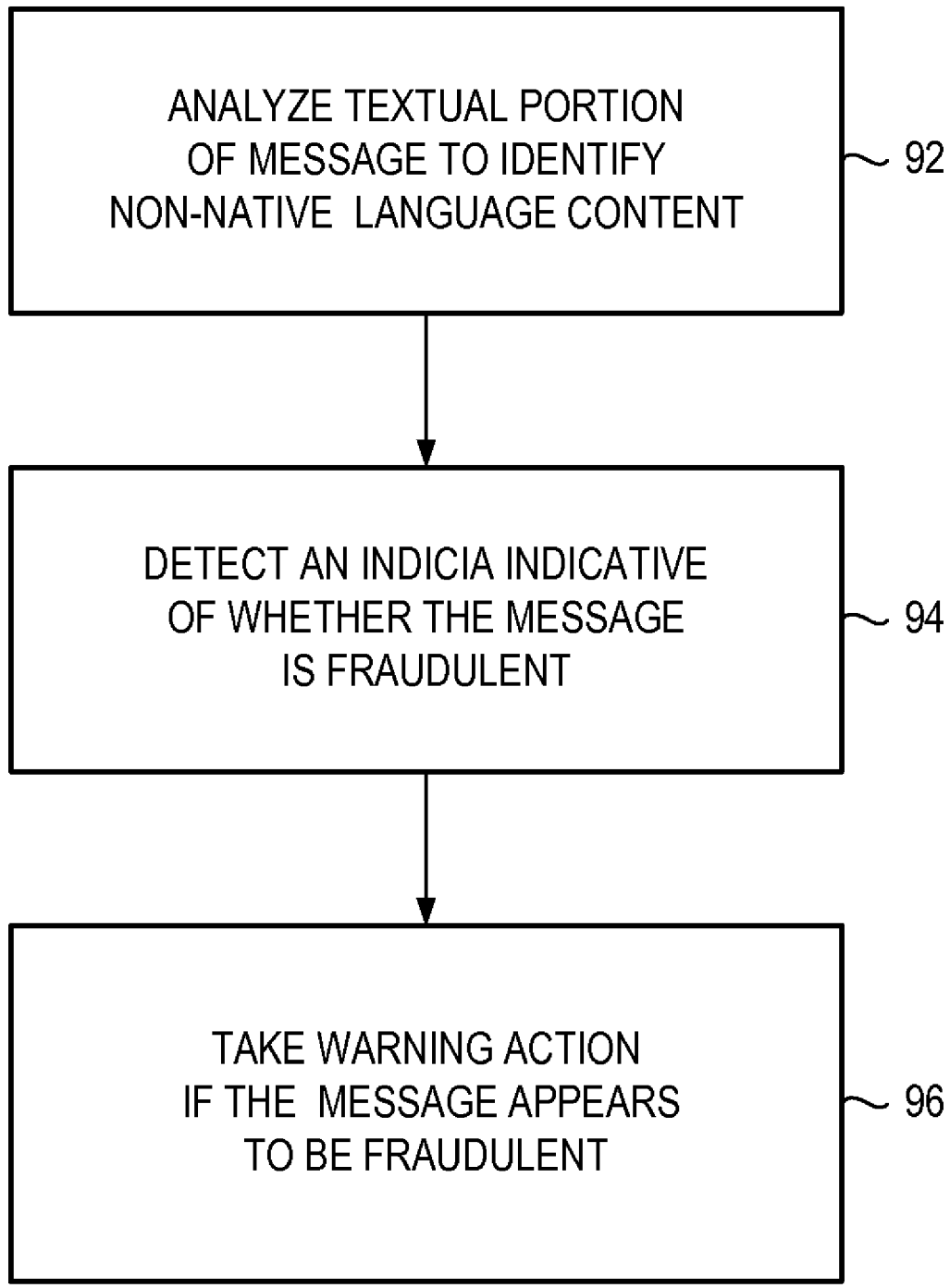
FIG. 3 illustrates a method flow diagram representative of the method of operation of an embodiment of the present invention.

FIG. 3 illustrates a method, shown generally at 88, representative of the method of operation of an embodiment of the present invention. The method facilitates detection that a received text message forms a fraudulent message. First, and as indicated at 92, a textual portion of the received text message is analyzed to detect non-native language content. Then, and as indicated at 94, detection is made, based upon the analysis, of at least an indicia indicative of whether the received message forms a fraudulent message.

Thereafter, and as indicated by the block 96, a warning action is taken in the event the received message appears to form a fraudulent message.

Because fraudulent-message determination takes into account grammatical, syntactical, and other errors made by non-native language speakers that author the fraudulent message, there is an increased likelihood that the fraudulent message shall be detected and warning action made in response to such detection.

The previous descriptions are of preferred examples for implementing the invention, and the scope of the invention should not necessarily be limited by this description. The scope of the present invention is defined by the following claims.

What is claimed is:

1. An apparatus for facilitating detection that a received text message forms a fraudulent message, said apparatus comprising:
   a text analyzer configured to analyze a textual portion of the received text message to detect non-native language content; and
   a detector configured to detect, based upon analysis made by said text analyzer, at least an indicia indicative of whether the received message forms a fraudulent message;
   in which the detector calculates a likelihood value indicative of a likelihood that the received text message forms a fraudulent message via a weighted function of the textual portion of the text message, non-native grammatical errors therein, non-native usage errors therein, and general errors therein; wherein the detector further calculates weighting factors associated with a number of variables within the weighting function.

2. The apparatus of claim 1 further comprising a grammatical rules error set, said grammatical rules error set identifying non-native language syntax.

3. The apparatus of claim 2 wherein said text analyzer is configured to access the grammatical rules set and to use the grammatical rules set pursuant to the analysis made by said text analyzer.

4. The apparatus of claim 2 wherein the grammatical rules error set comprises rules associated with grammatical errors made by non-native language speakers.

5. The apparatus of claim 2 wherein the grammatical rules error set comprises rules associated with usage errors made by non-native language speakers.

6. The apparatus of claim 2 wherein the grammatical rules error set comprises rules associated with general syntactical errors.

7. The apparatus of claim 1, wherein the likelihood value is calculated using a weighted textual portion weighted by a first weighting factor, weighted non-native grammatical errors weighted by a second weighting factor, weighted non-native usage, weighted by a third weighting factor, weighted general errors, weighted by a fourth weighting factor.

8. The apparatus of claim 7 wherein the first, second, third, and fourth weighting factors are unequal values.

9. The apparatus of claim 1 further comprising an alerter configured to generate an alert to alert detection by said detector of indicia indicative that the received message forms a fraudulent message.

10. A junk mail detector for detecting when a received email is a junk email, said junk mail detector comprising:
   an analyzer configured to analyze the received email for presence therein of content typically formed by non-native-language authors; and
   a warning generator configured to generate a warning display prior to display of the received email if analysis made by said analyzer indicates the received email to be junk email;
   in which the junk mail detector calculates a likelihood value indicative of a likelihood that the received email is a junk email by calculating a number of weighting factors such that the likelihood value is calculated using a function of a textual portion of the email weighted by a first weighting factor, non-native grammatical errors in the email weighted by a second weighting factor, non-native usage in the email weighted by a third weighting factor, and general errors in the email weighted by a fourth weighting factor.

11. The junk mail detector of claim 10, in which the first, second, third, and fourth weighting factors are unequal values.

12. A method for facilitating detection that a received text message forms a fraudulent message, said method comprising:
   analyzing a textual portion of the received text message to detect non-native language content; and
   detecting, based upon analysis made during said analyzing, at least an indicia indicative of whether the received message forms a fraudulent message,
   in which detecting an indicia indicative of whether the received message forms a fraudulent message further comprises calculating a likelihood value indicative of a likelihood that the received text message is a fraudulent text message via a weighted function of the textual portion, non-native grammatical errors therein, non-native usage errors therein, and general errors therein; in which the likelihood value is calculated by calculating weighting factors associated with a number of variables within the weighted function.

13. The method of claim 12 further comprising generating a warning if the indicia detected during said analyzing indicates that the received message forms a fraudulent message.

14. The method of claim 13 further comprising providing for selection of whether to display the received message.

15. The method of claim 12 wherein said analyzing comprises accessing a grammatical rules error set and comparing error rules therein with the received message.

16. The method of claim 15 wherein the grammatical rules error set comprises rules identifying non-native language syntax.

17. The method of claim 15 wherein the grammatical rules error set comprises rules associated with grammatical errors made by non-native language speakers.

18. The method of claim 15 wherein the grammatical rules error set comprises rules associated with usage errors made by non-native language speakers.

* * * * *

UNITED STATES PATENT AND TRADEMARK OFFICE
CERTIFICATE OF CORRECTION

| | |
|---|---|
| PATENT NO. | : 8,150,679 B2 |
| APPLICATION NO. | : 12/192913 |
| DATED | : April 3, 2012 |
| INVENTOR(S) | : Corey W. Wick et al. |

It is certified that error appears in the above-identified patent and that said Letters Patent is hereby corrected as shown below:

In column 9, line 5, in Claim 7, delete "usage," and insert -- usage --, therefor.

In column 9, line 6, in Claim 7, delete "errors," and insert -- errors --, therefor.

In column 9, lines 16-17, in Claim 10, delete "non-native-language" and insert -- non-native language --, therefor.

Signed and Sealed this
Twenty-seventh Day of November, 2012

David J. Kappos
*Director of the United States Patent and Trademark Office*